United States Patent
Tang et al.

(10) Patent No.: US 8,456,539 B2
(45) Date of Patent: Jun. 4, 2013

(54) METHOD OF AUTOMATIC TASK EXECUTION WITH TRIGGERING BY OBJECT ATTRIBUTE RECOGNITION, AND ELECTRONIC APPARATUS FOR IMPLEMENTING THE METHOD

(75) Inventors: Hsien-Hui Tang, Taipei (TW); Wen-Jong Wu, Taipei (TW); Yueh-Hsien Lin, Taipei (TW); Chih-Ying Yang, Taipei (TW); Yang-Bee Lee, Taipei (TW); Wen-Chieh Fang, Taipei (TW); Mu-Chern Fong, Taipei (TW); Cheng-Wei Chen, Taipei (TW); Gwen Hsiao, Taipei (TW)

(73) Assignee: National Taiwan University, Taipei (TW)

( * ) Notice: Subject to any disclaimer, the term of this patent is extended or adjusted under 35 U.S.C. 154(b) by 305 days.

(21) Appl. No.: 12/911,405

(22) Filed: Oct. 25, 2010

(65) Prior Publication Data

US 2011/0261229 A1      Oct. 27, 2011

(30) Foreign Application Priority Data

Apr. 23, 2010  (TW) ................................ 99112866 A (51) Int. Cl.
  *H04N 5/228*      (2006.01)
(52) U.S. Cl.
  USPC ....................................................... 348/222.1

(58) Field of Classification Search
  USPC ................................. 348/211.1, 222.1, 231.3
  See application file for complete search history.

(56) References Cited

U.S. PATENT DOCUMENTS

| | | | | |
|---|---|---|---|---|
| 6,133,951 A * | 10/2000 | Miyadera | ................... | 348/220.1 |
| 6,747,692 B2 * | 6/2004 | Patel et al. | ................. | 348/211.2 |
| 6,999,117 B2 * | 2/2006 | Yamazaki | ................. | 348/222.1 |
| 7,505,068 B2 * | 3/2009 | Silverbrook | ............... | 348/222.1 |
| 7,840,898 B2 * | 11/2010 | Hua et al. | ....................... | 715/723 |
| 2008/0049192 A1 * | 2/2008 | Nozaki et al. | ................... | 353/25 |

* cited by examiner

*Primary Examiner* — Gevell Selby
(74) *Attorney, Agent, or Firm* — Occhiuti Rohlicek & Tsao LLP (57) ABSTRACT

A method of automatic task execution is adapted to be performed by an electronic apparatus that includes an image-capturing module and a processing module. The method includes the steps of: a) recording in the processing module a relationship between a visible physical attribute of an object and a corresponding task to be executed by the processing module; b) configuring the electronic apparatus for capturing an image containing a target using the image-capturing module; c) configuring the processing module to determine if the visible physical attribute of the object is found in the image captured by the image-capturing module; and d) when the visible physical attribute of the object is found in the image, configuring the processing module to execute the corresponding task automatically.

14 Claims, 8 Drawing Sheets

METHOD OF AUTOMATIC TASK EXECUTION WITH TRIGGERING BY OBJECT ATTRIBUTE RECOGNITION, AND ELECTRONIC APPARATUS FOR IMPLEMENTING THE METHOD

CROSS-REFERENCE TO RELATED APPLICATION

This application claims priority of Taiwanese Application No. 099112866, filed on Apr. 23, 2010.

BACKGROUND OF THE INVENTION

1. Field of the Invention

The present invention relates to a method of task execution, more particularly to a method of automatic task execution with triggering by object attribute recognition.

2. Description of the Related Art

Technological advancement has changed the way people communicate. Nowadays, mobile phones are ubiquitous. Although elderly people may be able to use the basic voice call function, they may feel reluctant to use the newer functions such as short messaging service (SMS), multi-media messaging service (MMS), electronic mail (email), photographing, and video recording due to reasons such as poor eyesight, and lack of habit or interest.

To encourage elderly people to use the newer functions, several mobile phone manufacturers offer mobile phones with features such as larger displays, larger press buttons, and simpler control interfaces. Regardless of the outcome, most elderly people still feel reluctant to learn to use other electronic products, such as personal computers. Therefore, the subject of improvement of the present invention is to provide a relatively intuitive method of automatic task execution, thereby promoting use of the electronic products by elderly people.

SUMMARY OF THE INVENTION

Therefore, an object of the present invention is to provide a relatively intuitive method of automatic task execution.

Accordingly, a method of automatic task execution of the present invention is adapted to be performed by an electronic apparatus that includes an image-capturing module and a processing module. The method includes the steps of:

a) recording in the processing module a relationship between a visible physical attribute of an object and a corresponding task to be executed by the processing module;

b) configuring the electronic apparatus for capturing an image containing a target using the image-capturing module;

c) configuring the processing module to determine if the visible physical attribute of the object is found in the image captured by the image-capturing module; and d) when the visible physical attribute of the object is found in the image, configuring the processing module to execute the corresponding task automatically.

Another object of the present invention is to provide an electronic apparatus capable of automatic task execution. The electronic apparatus includes a processing module and an image-capturing module.

The processing module includes a storage medium that records a relationship between a visible physical attribute of an object and a corresponding task to be executed by the processing module. The image-capturing module is coupled to the processing module and is operable to capture an image containing a target.

The processing module is configured to determine if the visible physical attribute of the object is found in the image captured by the image-capturing module, and, when the visible physical attribute of the object is found in the image, to execute the corresponding task automatically.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
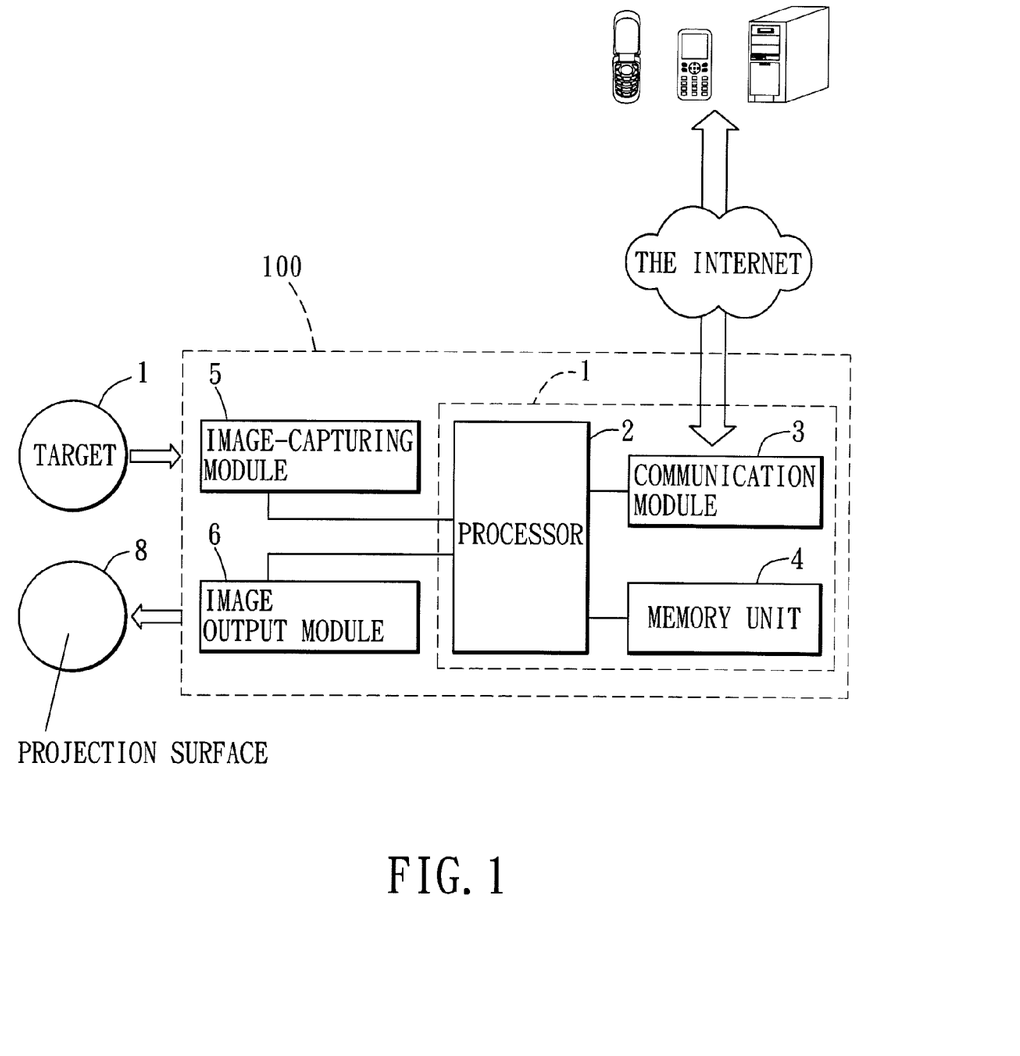
FIG. 1 is a functional block diagram of a personal computer (PC) in a configuration for performing the first, second, and third preferred embodiments of a method of automatic task execution according to the present invention.

Referring to FIG. 1, the first, second, and third preferred embodiments of a method of automatic execution according to the present invention are adapted to be performed by an electronic apparatus 100, which, in the preferred embodiments, is exemplified as a personal computer (PC) with image-capturing and image-projecting capabilities. However, implementation of the electronic apparatus 100 is not limited to such, and the electronic apparatus 100 may be implemented differently in other embodiments. The electronic apparatus 100 includes an image-capturing module 5, an image output module 6, and a processing module 1 including a processor 2, a communication unit 3, and a memory unit 4.

In the present embodiment, the image-capturing module 5 is a camera device for capturing images. However, in other embodiments, the image-capturing module 5 may be implemented otherwise. In this embodiment, the image output module 6 is an image projector for projecting images onto a surface 8. The memory unit 4 of the processing module 1 provides a storage medium for recording a relationship between a visible physical attribute of an object and a corresponding task. The corresponding task is a set of machine-executable instructions to be executed by the processor 2. The visible physical attribute of the object recorded in the storage medium is selected from the group consisting of a shape attribute, a color attribute, a symbol attribute, and combinations thereof. However, selection of the visible physical attribute of the object in the storage medium is not limited to such.

Figure 2:
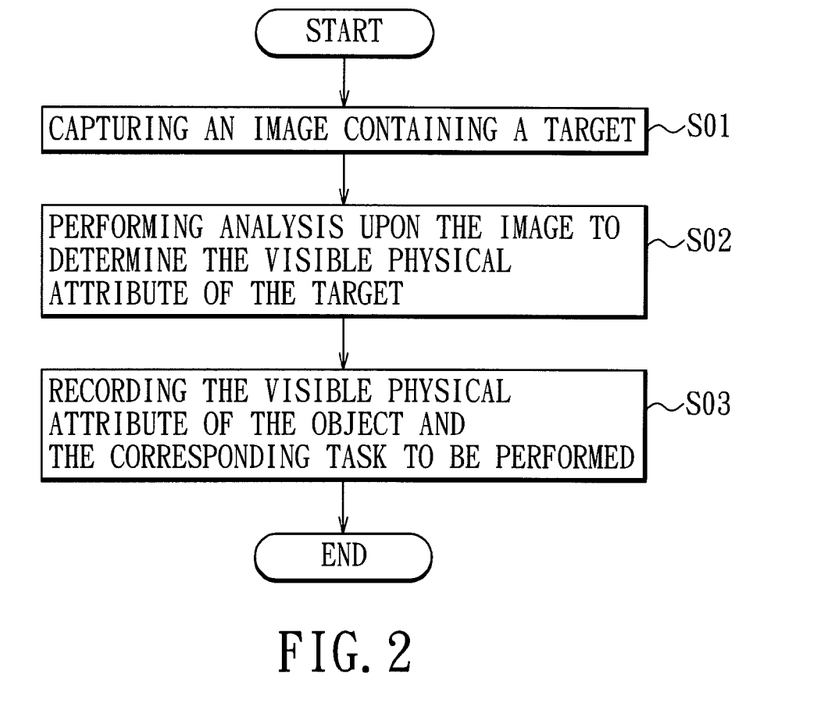
FIG. 2 is a flowchart illustrating steps for pre-configuring the PC prior to performing the method.

Referring to FIG. 2, prior to using the electronic apparatus 100, step S01 to step S03 need to be executed to thereby establish in the memory unit 4 the relationship between the visible physical attribute of the object and the corresponding task.

In step S01, the electronic apparatus 100 is configured to use the image-capturing module 5 to capture an image containing a target 7.

In step S02, the electronic apparatus 100 is configured to use the processor 2 to perform analysis upon the image captured by the image-capturing module 5 so as to determine the visible physical attribute of the target 7. For example, if the target 7 is a re-adherable flag, the visible physical attribute of the target 7 may be a combination of the color attribute of the re-adherable flag and the shape attribute of the re-adherable flag.

In step S03, the electronic apparatus 100 is configured to record in the memory unit 4 the visible physical attribute of the object (i.e., the visible physical attribute of the target 7 as determined in step S02), and the corresponding task to be performed by the processing module 1.

The electronic apparatus 100 is operable once the relationship between the visible physical attribute of the object and the corresponding task is established in the memory unit 4. Operation of the electronic apparatus 100 in each of the first, second, and third preferred embodiments is described hereinafter.

Figure 3:
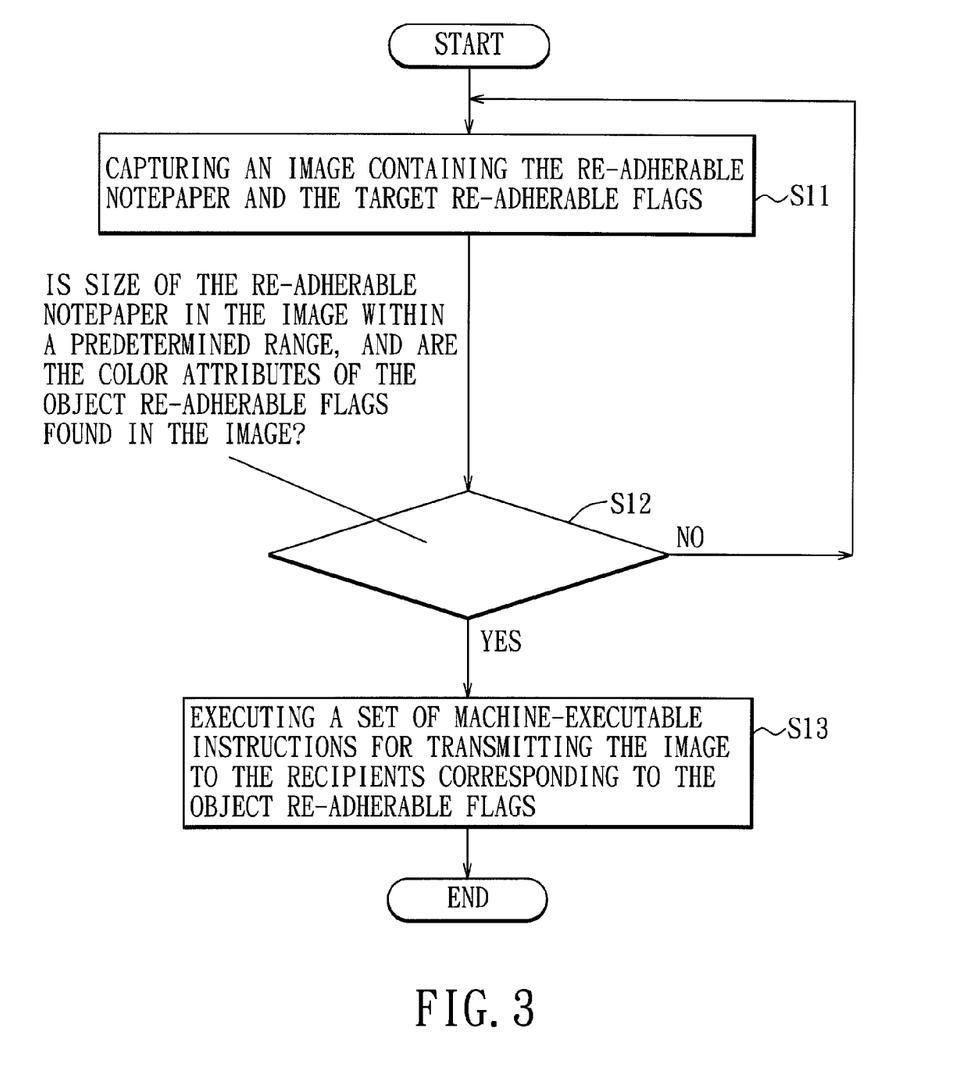
FIG. 3 is a flowchart illustrating steps of the method of the first preferred embodiment.
Figure 4:
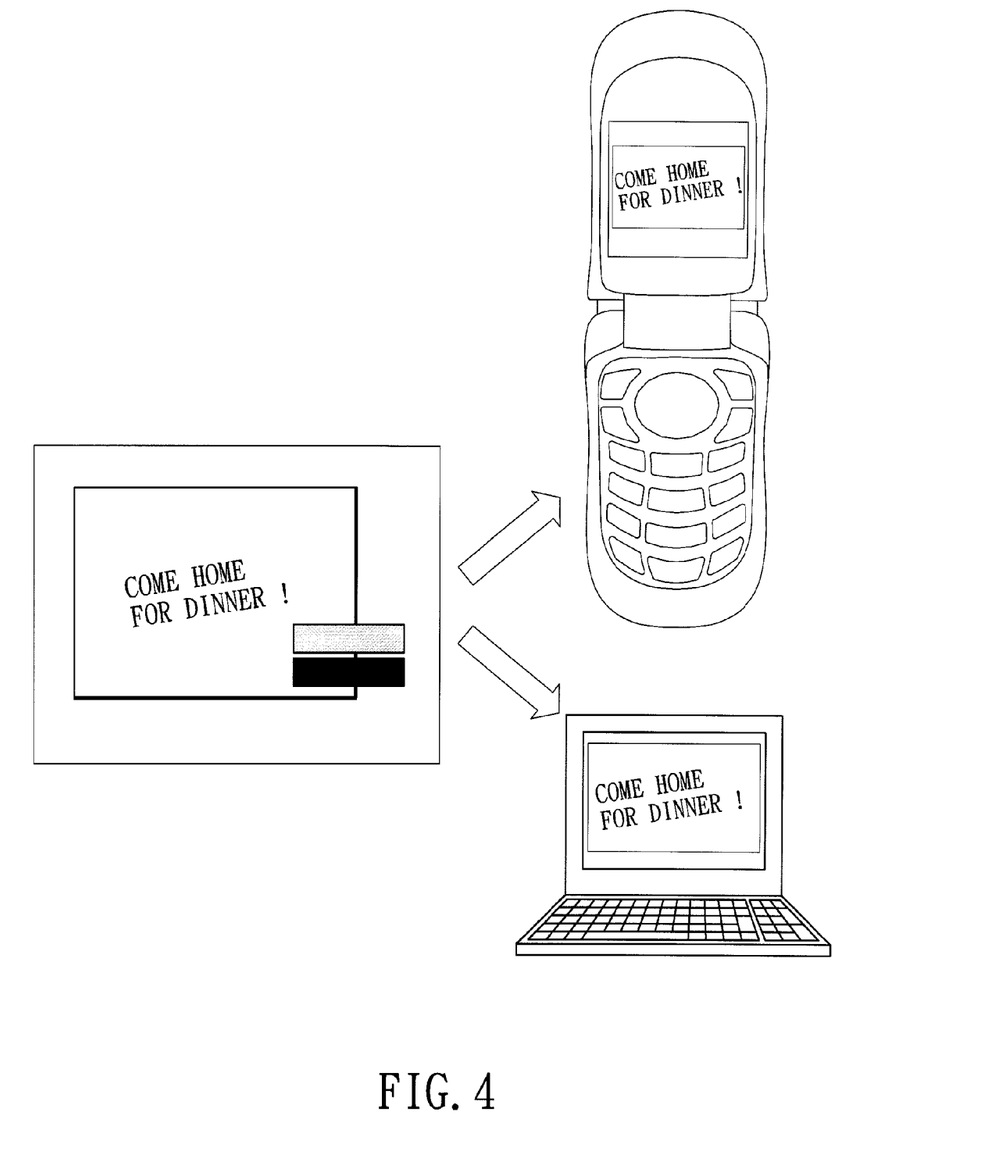
FIGS. 4 and 5 are diagrams illustrating an exemplary application of the method of the first preferred embodiment.

Referring to FIGS. 3 and 4, in the first preferred embodiment, a plurality of relationships are established in the memory unit 4. Two of the objects corresponding to the relationships recorded in the memory unit 4 are object re-adherable flags with respective color attributes and correspond to, say, two respective recipients. In the example of FIG. 4, the target 7 includes a re-adherable notepaper and two target re-adherable flags on the re-adherable notepaper. A short message for the recipient is written on the re-adherable notepaper. Each of the target re-adherable flags has a distinct color. The task in this embodiment is to transmit the image captured by the image-capturing module 5 to the recipients corresponding to said two of the objects.

In step S11, the electronic apparatus 100 is configured to use the image-capturing module 5 to capture an image containing the re-adherable notepaper and the target re-adherable flags.

In step S12, the electronic apparatus 100 is configured to use the processor 2 to analyze whether size of the re-adherable notepaper in the image captured by the image-capturing module 5 is within a predetermined range, to determine that a re-adherable notepaper is found in the image if affirmative, and to determine that a re-adherable notepaper is not found in the image and to proceed back to step S11 if otherwise. Once the electronic apparatus 100 determines that a re-adherable notepaper is found in the image, it is further configured to determine that the color attributes of the object re-adherable flags are found in the image and to proceed to step S13 if the color of any of the target re-adherable flags matches the color attribute of a respective one of the object re-adherable flags, and to determine that the color attributes of the object re-adherable flags are not found in the image and to proceed back to step S11 if otherwise.

It is to be noted that when the object re-adherable flags are not found in the image, the electronic apparatus 100 can output an image through the image output module 6 to indicate that the image captured by the image-capturing module 5 has no matching recipient. Furthermore, if only one of the color attributes of the object re-adherable flags is found in the image, the image will be transmitted to the sole recipient corresponding to said one of the color attributes of the object re-adherable flags.

In step S13, the electronic apparatus 100 is configured to execute a set of machine-executable instructions (i.e., the task) for transmitting the image captured by the image-capturing module 5 via the communication module 3 to the recipients corresponding to the object re-adherable flags. The image may be transmitted to the recipients via mms, email, etc., according to the relationships established in the memory unit 4.

Figure 5:
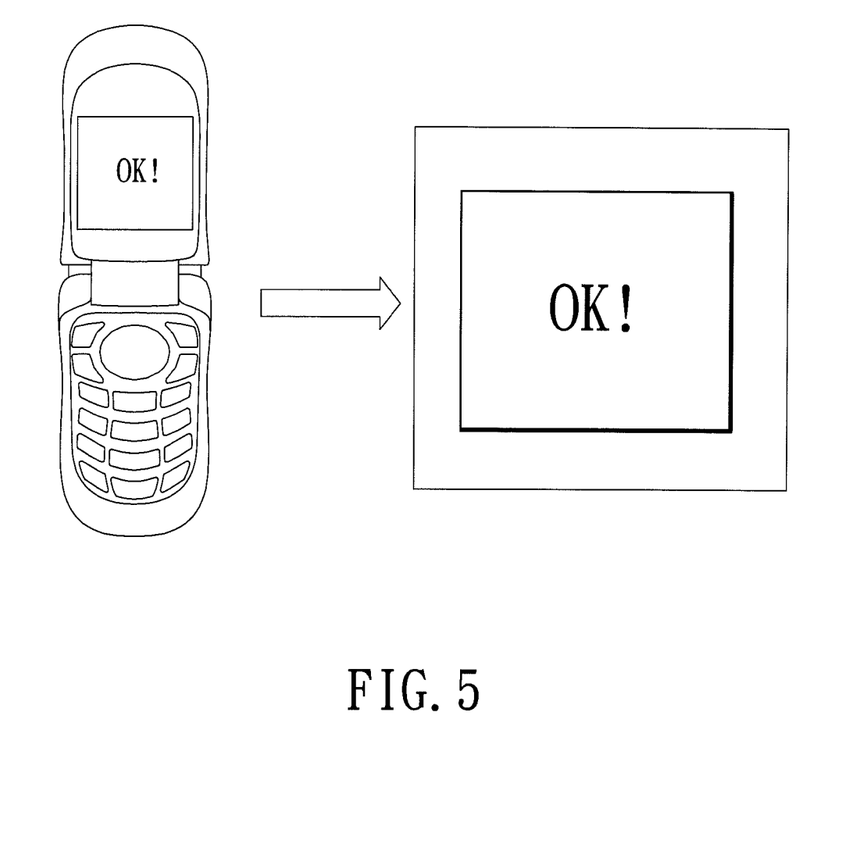

Referring to FIG. 5, when the image from the electronic apparatus 100 is received by the recipients, the recipients may, in response to the short message written on the re-adherable notepaper contained in the image, reply by email, SMS message, MMS message, etc. When the electronic apparatus 100 receives the replies from the recipients, it is operable to output images corresponding to the replies through the image output module 6 (i.e., the image projector).

Figure 6:
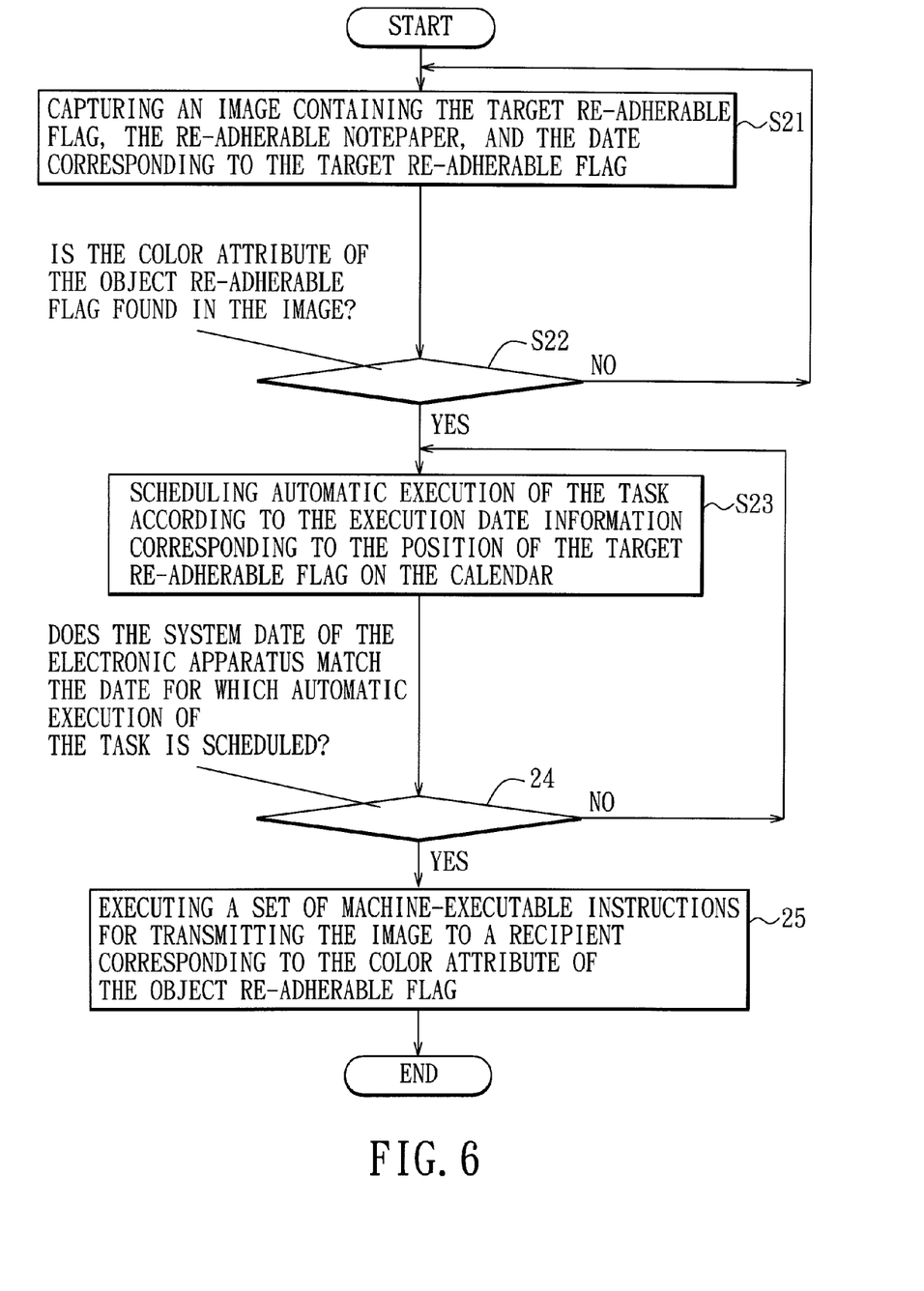
FIG. 6 is a flowchart illustrating steps of the method of the second preferred embodiment.
Figure 7:
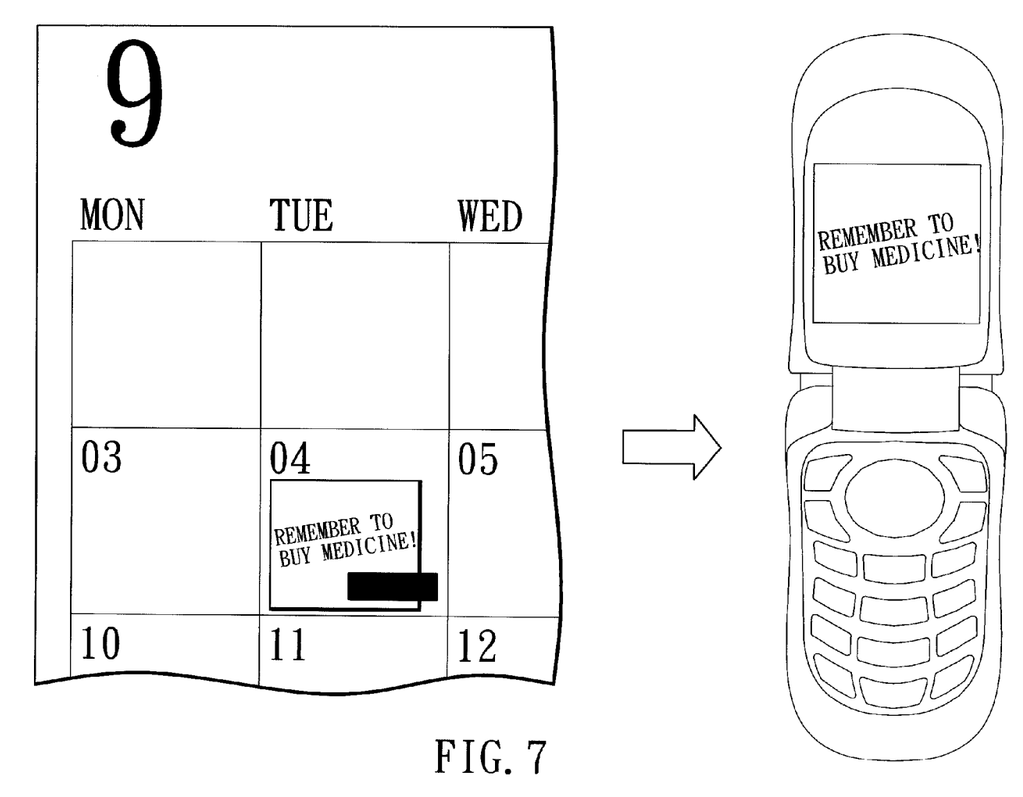
FIG. 7 is a diagram illustrating an exemplary application of the method of the second preferred embodiment.

Referring to FIGS. 6 and 7, the method of the second preferred embodiment is similar to that of the first preferred embodiment, but involves scheduling of automatic task execution. In the second preferred embodiment, the target 7 is a target re-adherable flag disposed on a re-adherable notepaper on a calendar, and is disposed to correspond in position to a date, and the visible physical attribute of the target re-adherable flag is the color attribute of the same. Furthermore, one of the objects corresponding to the relationships in the memory unit 4 is an object re-adherable flag, and the visible physical attribute of the object re-adherable flag is the color attribute of the same. It is to be noted that the visible physical attribute of the target re-adherable flag and the visible physical attribute of the object re-adherable flag are not limited to such, and may be selected from the group consisting of a color attribute, a shape attribute, a symbol attribute, and combinations thereof.

It is to be noted that, in a modification of the second preferred embodiment, the target 7 may be a combination of a target re-adherable notepaper on the calendar and a target re-adherable flag thereon.

In step S21, the electronic apparatus 100 is configured to use the image-capturing module 5 to capture an image containing the target re-adherable flag, the re-adherable notepaper, and the date corresponding to the target re-adherable flag.

In step S22, the electronic apparatus 100 is configured to use the processor 2 to analyze whether the color attribute of the object re-adherable flag is found in the image. Once the electronic apparatus 100 determines that the color attribute of the object re-adherable flag is found in the image, it is further configured to obtain relevant execution date information by performing optical character recognition (OCR) upon the date corresponding to the target re-adherable flag, or, if layout of the dates on the calendar is recorded in the memory unit 4 in advance, by comparing position of the target re-adherable flag with the layout of the dates on the calendar. In the example of FIG. 7, the electronic apparatus 100 determines that the target re-adherable flag corresponds in position to a date of September 4.

In step S23, the electronic apparatus 100 is configured to schedule automatic execution of the task according to the execution date information corresponding to the position of the target re-adherable flag on the calendar.

In step S24, the electronic apparatus 100 is configured to determine whether the system date of the electronic apparatus 100 matches the date for which automatic execution of the task is scheduled, to proceed to step S25 if affirmative, and to proceed back to step S23 if otherwise.

In step S25, the electronic apparatus 100 is configured to execute a set of machine-executable instructions (i.e., the task) for transmitting the image captured by the image-capturing module 5 in step S21 via the communication module 3 to a recipient corresponding to the color attribute of the object re-adherable flag according to the relationship established in the memory unit 4.

It is to be noted that, in performing a modification based on the methods of the first and second preferred embodiments, the message may be marked directly on the calendar. Furthermore, the electronic apparatus 100 is configured to schedule automatic task execution according to a re-adherable flag on the calendar that corresponds to the message and the specific date.

Figure 8:
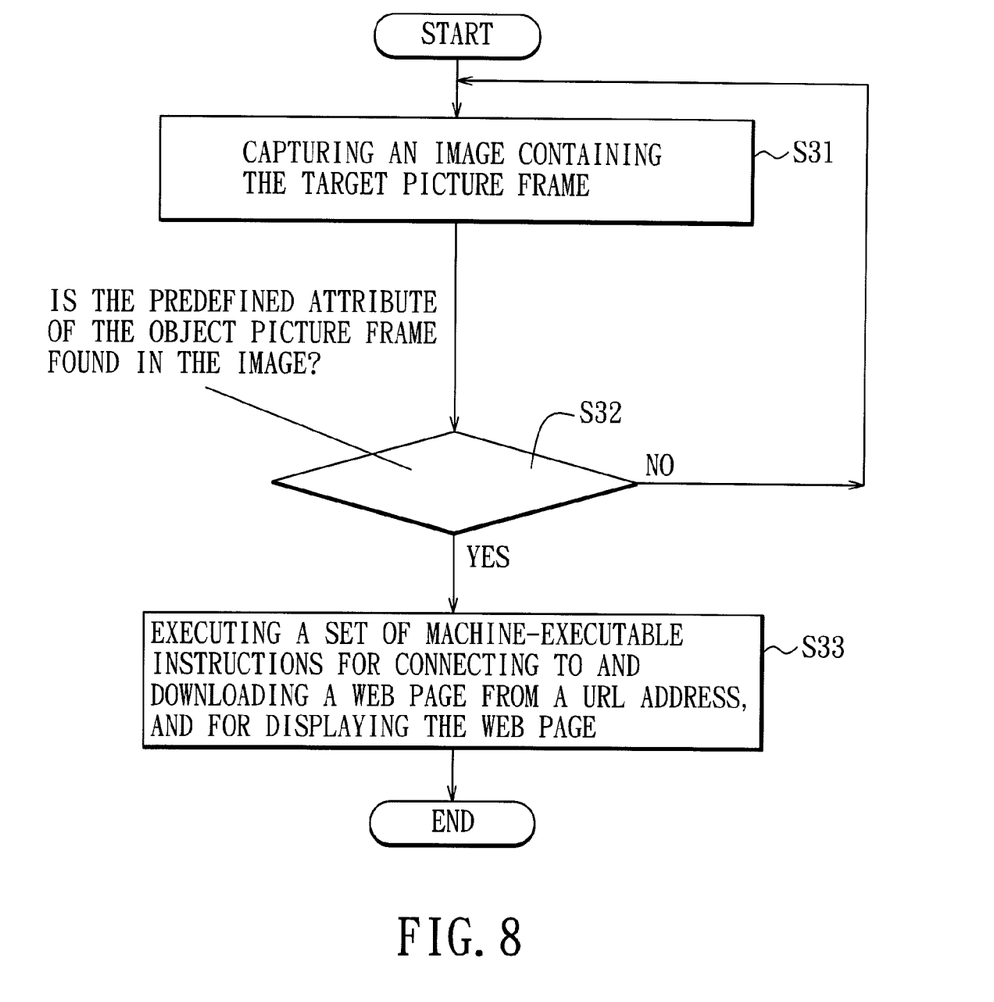
FIG. 8 is a flowchart illustrating steps of the method of the third preferred embodiment.

Referring to FIG. 8, the method of the third preferred embodiment involves downloading and rendering of web pages. In the third preferred embodiment, the target 7 is a target picture frame without a picture, and the visible physical attribute is the color attribute. However, in other embodiments, the visible physical attribute may be selected from the group consisting of a shape attribute, a color attribute, a symbol attribute, and combinations thereof. One of the objects corresponding to the relationships recorded in the memory unit 4 is an object picture frame with a respective color attribute that corresponds to a uniform resource locator (URL) address corresponding to such as a network server (or a PC). The task in this embodiment is to connect to and download a web page from the network server (or the PC) and to display the downloaded web page through the image output module 6.

In step S31, the electronic apparatus 100 is configured to use the image-capturing module 5 to capture an image containing the target picture frame.

In step S32, the electronic apparatus 100 is configured to use the processor 2 to determine whether the predefined attribute of the object picture frame is found in the image captured by the image-capturing module 5, to proceed to step S33 if affirmative, and to proceed back to step S31 if otherwise.

In step S33, the electronic apparatus 100 is configured to execute a set of machine-executable instructions (i.e., the task) for connecting to and downloading a web page from the URL address via the communication module 4, and for displaying the web page through the image output module 6.

In summary, the present invention provides a relatively intuitive method of automatic scheduling and execution of tasks, such as transmitting and receiving images, to be performed by an electronic apparatus with an image-capturing module, a processing module, and an image output module.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of automatic task execution adapted to be performed by an electronic apparatus, the electronic apparatus including an image-capturing module and a processing module, said method comprising the steps of:
   a) recording in the processing module a relationship between a visible physical attribute of an object and a corresponding task to be executed by the processing module;
   b) configuring the electronic apparatus for capturing an image containing a target using the image-capturing module;
   c) configuring the processing module to determine if the visible physical attribute of the object is found in the image captured by the image-capturing module; and
   d) when the visible physical attribute of the object is found in the image, configuring the processing module to execute the corresponding task automatically;
   wherein, in step a), the visible physical attribute of the object is selected from the group consisting of a shape attribute, a color attribute, a symbol attribute, and combinations thereof; and
   wherein the object is a re-adherable flag, the target includes a re-adherable flag, and, in step d), the corresponding task is executed when the target contained in the image has a visible physical attribute matching that of the object.

2. The method as claimed in claim 1, wherein the corresponding task is to transmit the image captured by the image-capturing module to a predetermined recipient defined in the relationship recorded in the processing module.

3. The method as claimed in claim 2, wherein, in step d), the image is transmitted to the predetermined recipient via one of multi-media messaging service, electronic mail, and uploading to a network server.

4. A method of automatic task execution adapted to be performed by an electronic apparatus, the electronic apparatus including an image-capturing module and a processing module, said method comprising the steps of:
   a) recording in the processing module a relationship between a visible physical attribute of an object and a corresponding task to be executed by the processing module;
   b) configuring the electronic apparatus for capturing an image containing a target using the image-capturing module;
   c) configuring the processing module to determine if the visible physical attribute of the object is found in the image captured by the image-capturing module; and
   d) when the visible physical attribute of the object is found in the image, configuring the processing module to execute the corresponding task automatically;
   wherein:
   in step b), the captured image contains execution date information; and
   in step d), the processing module is configured to determine the execution date information from the captured image, and to schedule automatic execution of the corresponding task according to the execution date information contained in the captured image.

5. The method as claimed in claim 4, wherein:
   in step b), the target is on a calendar and is disposed to correspond in position to a date; and
   in step d), the execution date information is determined based on the date on the calendar that corresponds in position to the target.

6. The method as claimed in claim 4, wherein the corresponding task is to transmit the image captured by the image-capturing module to a predetermined recipient defined in the relationship recorded in the processing module.

7. The method as claimed in claim 6, wherein, in step d), the image is transmitted to the predetermined recipient via one of multi-media messaging service, electronic mail, and uploading to a network server.

8. An electronic apparatus capable of automatic task execution, said electronic apparatus comprising:
   a processing module including a storage medium that records a relationship between a visible physical attribute of an object and a corresponding task to be executed by said processing module; and an image-capturing module coupled to said processing module and operable to capture an image containing a target;

wherein said processing module is configured to determine if the visible physical attribute of the object is found in the image captured by said image-capturing module, and, when the visible physical attribute of the object is found in the image, to execute the corresponding task automatically;

wherein the visible physical attribute of the object recorded in said storage medium is selected from the group consisting of a shape attribute, a color attribute, a symbol attribute, and combinations thereof; and wherein the object is a re-adherable flag, the target includes a re-adherable flag, and the corresponding task is executed by said processing module when the target contained in the image has a visible physical attribute matching that of the object.

9. The electronic apparatus as claimed in claim 8, wherein the corresponding task is to transmit the image captured by said image-capturing module to a predetermined recipient defined in the relationship recorded in said storage medium.

10. The electronic apparatus as claimed in claim 9, wherein the image is transmitted to the predetermined recipient via one of multi-media messaging service, electronic mail, and uploading to a network server when said processing module executes the corresponding task.

11. An electronic apparatus capable of automatic task execution, said electronic apparatus comprising:

a processing module including a storage medium that records a relationship between a visible physical attribute of an object and a corresponding task to be executed by said processing module; and an image-capturing module coupled to said processing module and operable to capture an image containing a target;

wherein said processing module is configured to determine if the visible physical attribute of the object is found in the image captured by said image-capturing module, and, when the visible physical attribute of the object is found in the image, to execute the corresponding task automatically;

wherein:

the image captured by said image-capturing module contains execution date information; and the processing module is configured to determine the execution date information from the captured image, and to schedule automatic execution of the corresponding task according to the execution date information contained in the captured image.

12. The electronic apparatus as claimed in claim 11, wherein:

in the image captured by said image-capturing module, the target is on a calendar and is disposed to correspond in position to a date; and said processing module is configured to determine the execution date information based on the date on the calendar that corresponds in position to the target.

13. The electronic apparatus as claimed in claim 11, wherein the corresponding task is to transmit the image captured by said image-capturing module to a predetermined recipient defined in the relationship recorded in said storage medium.

14. The electronic apparatus as claimed in claim 13, wherein the image is transmitted to the predetermined recipient via one of multi-media messaging service, electronic mail, and uploading to a network server when said processing module executes the corresponding task.

* * * * *